(12) United States Patent
Xu et al.

(10) Patent No.: US 10,903,730 B2
(45) Date of Patent: Jan. 26, 2021

(54) POWER TOOL

(71) Applicants: Nanjing Chervon Industry Co., Ltd., Nanjing (CN); Chervon (HK) Limited, Wanchai (HK)

(72) Inventors: Qian Xu, Nanjing (CN); Shibo Chen, Nanjing (CN)

(73) Assignees: Nanjing Chervon Industry Co., Ltd., Nanjing (CN); Chervon (HK) Limited, Wanchai (HK)

( * ) Notice: Subject to any disclaimer, the term of this patent is extended or adjusted under 35 U.S.C. 154(b) by 55 days.

(21) Appl. No.: 16/252,346

(22) Filed: Jan. 18, 2019

(65) Prior Publication Data
US 2019/0229599 A1 Jul. 25, 2019

Related U.S. Application Data

(63) Continuation of application No. PCT/CN2016/104808, filed on Nov. 7, 2016.

(30) Foreign Application Priority Data

Jul. 29, 2016 (CN) .......................... 2016 1 0619254
Aug. 1, 2016 (CN) .......................... 2016 1 0624163

(51) Int. Cl.
    *H02K 23/64* (2006.01)
    *H02K 3/28* (2006.01)
    (Continued)

(52) U.S. Cl.
    CPC .............. *H02K 23/64* (2013.01); *B25F 5/00* (2013.01); *H02K 11/33* (2016.01); *H02K 23/00* (2013.01);
    (Continued)

(58) Field of Classification Search
    CPC ............ H02K 3/00; H02K 3/28; H02K 19/00; H02K 19/06; H02K 19/19; H02K 23/00;
    (Continued)

(56) References Cited

U.S. PATENT DOCUMENTS 5,200,661 A    4/1993    Shramo et al.
6,236,173 B1 *  5/2001    Meyer ....................... H02P 3/06
                                                  318/246
(Continued)

OTHER PUBLICATIONS

ISA/CN, International Search Report issued on PCT application No. PCT/CN2016/104808, dated Apr. 28, 2017, 3 pages.

*Primary Examiner* — Tran N Nguyen
(74) *Attorney, Agent, or Firm* — Greenberg Traurig, LLP

(57) ABSTRACT

A power tool includes a motor, a first power source access circuit, a first drive circuit, a second power source access circuit and a second drive circuit. The motor includes a rotor, a stator, a plurality of first-type windings and a plurality of second-type windings. The rotor is configured to rotate about a central axis. The stator includes a ring-shaped yoke portion, and a plurality of teeth. The plurality of first-type windings are configured to be wound around part of the plurality of teeth and the plurality of second-type windings are configured to be wound around other part of the plurality of teeth. The first power source access circuit is configured to access a first power source with a first voltage. The first drive circuit includes a plurality of first-type electronic switches connected between the plurality of first-type windings and the first power source access circuit. The second power source access circuit is configured to access a second power source with a second voltage. The second drive circuit includes a plurality of second-type electronic switches connected between the plurality of second-type windings and the second power source access circuit. The plurality of first-type windings and the plurality of second- (Continued)

type windings are spaced in a circumferential direction of the central axis.

21 Claims, 11 Drawing Sheets

(51) Int. Cl.
  *H02K 23/34*   (2006.01)
  *H02K 23/00*   (2006.01)
  *H02K 23/26*   (2006.01)
  *H02P 4/00*   (2006.01)
  *H02K 11/33*   (2016.01)
  *B25F 5/00*   (2006.01)

(52) U.S. Cl.
  CPC .............. *H02K 23/26* (2013.01); *H02K 23/34* (2013.01); *H02P 4/00* (2013.01)

(58) Field of Classification Search
  CPC ........ H02K 23/26; H02K 23/34; H02K 23/64; H02P 4/00; H02P 72/00; H02P 72/92; H02P 3/00; H02P 3/06; H02P 25/00; H02P 25/22
  See application file for complete search history.

(56) References Cited

U.S. PATENT DOCUMENTS

| | | |
|---|---|---|
| 7,276,831 B1 | 10/2007 | Durham et al. |
| 2003/0127932 A1 | 7/2003 | Ishida et al. |
| 2011/0193504 A1* | 8/2011 | Nakajima ............... H02P 9/105 318/139 |

* cited by examiner

POWER TOOL

TECHNICAL FIELD

The present disclosure relates to power tools and, in particular, to a power tool powered by two power sources with different voltages.

BACKGROUND

Existing power tools are classified into two types: one type is powered by an alternating current (AC) power source and the other type is powered by a direct current (DC) power source. Tools powered by the AC power source can only be used near a power outlet, and it is inconvenient to use these power tools out of the range of the power outlet. In this case, the AC-powered power tools need to be provided with the DC power source, so as to work at a distance from the power outlet.

However, because the DC power source stores limited electrical energy, it will be of great convenience for users to continue their work by powering the power tools with the AC power source when the electrical energy of the DC power source is exhausted.

Therefore, a power tool accessible to both the AC power source and the DC power source is required.

SUMMARY

The present disclosure adopts the solutions described below.

A power tool includes a motor, a first power source access circuit, a first drive circuit, a second power source access circuit and a second drive circuit. The motor includes a rotor, a stator, a plurality of first-type windings and a plurality of second-type windings. The rotor is configured to rotate about a central axis. The stator includes a ring-shaped yoke portion, and a plurality of teeth formed by protruding from an inner side or an outer side of the ring-shaped yoke portion. The plurality of first-type windings are configured to be wound around part of the plurality of teeth and the plurality of second-type windings are configured to be wound around other part of the plurality of teeth. The first power source access circuit is configured to access a first power source with a first voltage. The first drive circuit includes a plurality of first-type electronic switches connected between the plurality of first-type windings and the first power source access circuit. The second power source access circuit is configured to access a second power source with a second voltage. The second drive circuit includes a plurality of second-type electronic switches connected between the plurality of second-type windings and the second power source access circuit. The plurality of first-type windings and the plurality of second-type windings are spaced in a circumferential direction of the central axis.

Furthermore, the power tool may include a controller configured to generate a control signal for switching on or off the plurality of first-type electronic switches and/or the plurality of second-type electronic switches. The controller may be electrically connected to the first drive circuit and the second drive circuit.

Furthermore, the power tool may include a detection circuit and a switch. The detection circuit is configured to detect whether the first power source access circuit is in access to the first power source. The switch may be configured to switch on or off an electrical connection between the first power source access circuit and the first drive circuit. When the second power source access circuit accesses the second power source, the detection circuit controls the switch to switch off the electrical connection between the first power source access circuit and the first drive circuit.

Furthermore, the power tool may include an indication module configured to indicate whether the first power source access circuit is in access to the first power source and/or whether the second power source access circuit is in access to the second power source. The indication module may be electrically connected to the first power source access circuit and the second power source access circuit.

Furthermore, the power tool may include an indication module. The indication module includes a first indication unit configured to indicate whether the first power source access circuit is in access to the first power source and a second indication unit configured to indicate whether the second power source access circuit is in access to the second power source. The first indication unit may be electrically connected to the first power source access circuit and the second indication unit may be electrically connected to the second power source access circuit.

Furthermore, the power tool may include a signal switch configured to transmit a switch signal for starting or activating the controller.

Furthermore, the sum of the number of the plurality of first-type windings and the number of the plurality of second-type windings may be an even multiple of the number of phases of the motor.

Furthermore, the motor may be a three-phase motor, and the sum of the number of the plurality of first-type windings and the number of the plurality of second-type windings may be a multiple of 6.

Furthermore, the motor may have a substantially same output characteristic parameter when the first power source access circuit accesses the first power source and when the second power source access circuit accesses the second power source. The output characteristic parameter of the motor may include a rotational speed, torque or output power of the motor.

Furthermore, the plurality of first-type windings and the plurality of second-type windings may have different winding wire diameters and/or numbers of winding turns.

Furthermore, the first power source accessed by the first power source access circuit may be a direct current power source and the second power source accessed by the second power source access circuit may be an alternating current power source and the plurality of first-type windings may form an angular connection and the plurality of second-type windings may form a star connection.

Furthermore, the plurality of first-type electronic switches may have a lower withstand voltage value than the plurality of second-type electronic switches.

Another power tool includes a first power source access circuit, a second power source access, a motor, a first drive circuit and a second drive circuit. The first power source access circuit is configured to access a first power source with a first voltage. The second power source access circuit is configured to access a second power source with a second voltage. The motor includes a rotor, a stator, a plurality of first-type windings and a plurality of second-type windings. The rotor is configured to rotate about a central axis. The stator includes a ring-shaped yoke portion, and a plurality of teeth formed by protruding from an inner side or outer side of the ring-shaped yoke portion. The plurality of first-type windings are configured to generate a first magnetic field under an action of the first power source, and the plurality of second-type windings are configured to generate a second magnetic field overlapping the first magnetic field under an action of the second power source. The first drive circuit includes a plurality of first-type electronic switches connected between the plurality of first-type windings and the first power source access circuit. The second drive circuit including a plurality of second-type electronic switches connected between the plurality of second-type windings and the second power source access circuit. The plurality of first-type windings and the plurality of second-type windings are arranged in a radial direction of the central axis.

Furthermore, the power tool may include an insulating layer disposed between the plurality of the first-type windings and the plurality the second-type windings.

Furthermore, the power tool may include a first controller and a second controller. The first controller may be configured to generate a control signal for switching on or off the plurality of first-type electronic switches. The second controller may be configured to generate a control signal for switching on or off the plurality of second-type electronic switches. The first controller may be communicatively connected to the second controller.

Furthermore, the power tool may include a detection circuit and a switch. The detection circuit may be configured to detect whether the first power source access circuit is in access to the first power source. The switch may be configured to switch on or off an electrical connection between the first power source access circuit and the first drive circuit. When the second power source access circuit accesses the second power source, the detection circuit may control the switch to switch off the electrical connection between the first power source access circuit and the first drive circuit.

Furthermore, the power tool may include an indication module. The indication module may include a first indication unit and a second indication unit. The first indication unit may be configured to indicate whether the first power source access circuit is in access to the first power source. The second indication unit may be configured to indicate whether the second power source access circuit is in access to the second power source. The first indication unit may be electrically connected to the first power source access circuit and the second indication unit may be electrically connected to the second power source access circuit.

Furthermore, the power tool may include a signal switch configured to transmit a switch signal for starting or activating the first controller or the second controller.

Furthermore, the motor may be a three-phase motor.

Furthermore, the first power source accessed by the first power source access circuit may be an alternating current power source and the second power source accessed by the second power source access circuit may be a direct current power source and the ratio of an output characteristic parameter of the motor when the first power source access circuit is in access to the first power source to the of the motor output characteristic parameter when the second power source access circuit is in access to the second power source may be within a value range of 0.8 to 1.2. The output characteristic parameter of the motor may include a rotational speed, torque or output power of the motor.

Furthermore, the plurality of first-type windings and the plurality of second-type windings may have different winding wire diameters and/or numbers of winding turns.

Furthermore, the first power source accessed by the first power source access circuit may be a direct current power source and the second power source accessed by the second power source access circuit may be an alternating current power source and the plurality of first-type windings may form an angular connection and the plurality of second-type windings may form a star connection.

Furthermore, the plurality of first-type electronic switches may have a lower withstand voltage value than the plurality of second-type electronic switches.

The power tool in the foregoing solutions may operate under different voltages, thereby improving adaptability of the power tool to a power source and facilitating users' use thereof.

DETAILED DESCRIPTION

Figure 1:
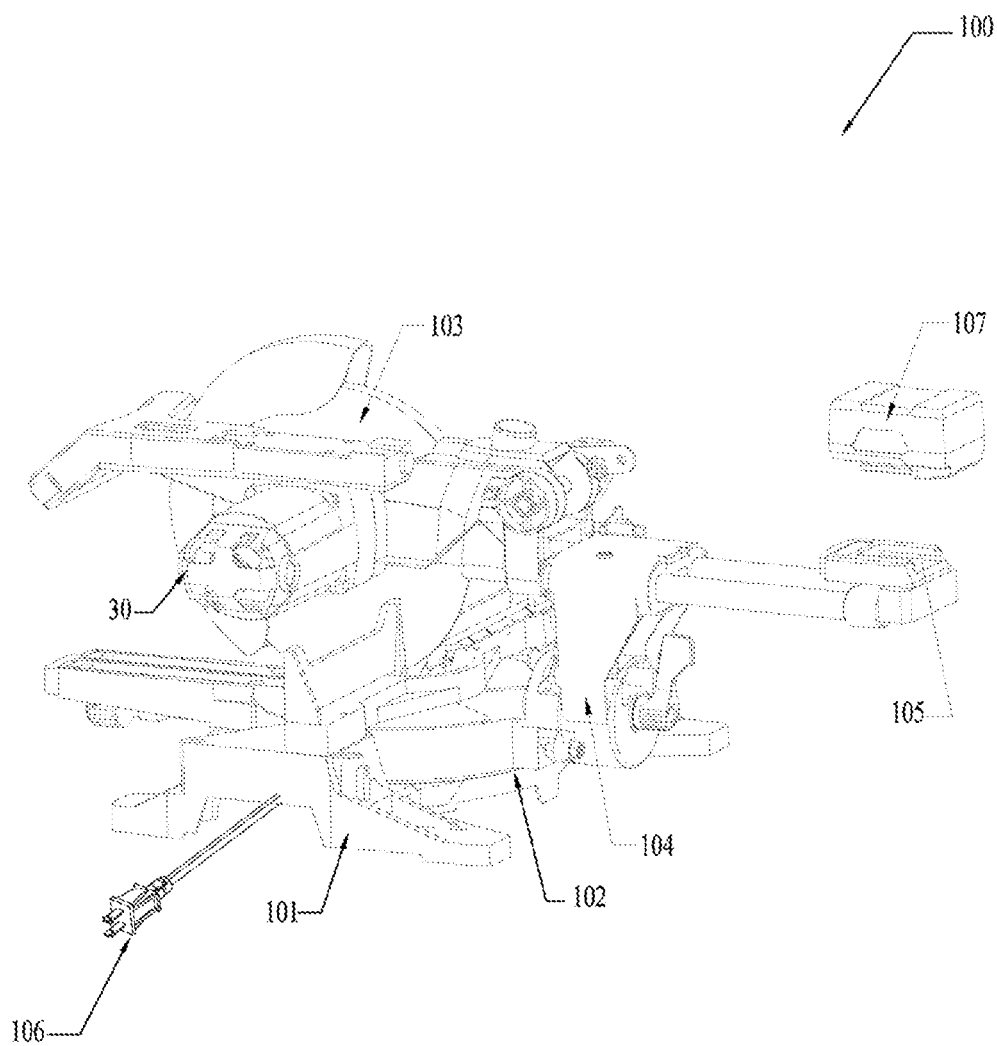
FIG. 1 is a structural diagram of an example power tool.

The present disclosure will be described below in detail in conjunction with the accompanying drawings and examples.

A miter saw is used as an example for convenience of description of a power tool 100 provided by referring to FIG. 1 to FIG. 6. The power tool 100 includes a base 101, a bench 102, a saw blade 103, a first power source access circuit 10, a second power source access circuit 20, a motor 30, a first drive circuit 12, a second drive circuit 22 and a controller 40.

The base 101 is configured to support the bench 102 so that the power tool 100 may be smoothly placed on the ground or an operation plane. The bench 102 is rotatably connected to the base 101 and configured to place a workpiece. The saw blade 103 is pivotally connected to the bench 102 by a support 104 and configured to cut the workpiece. The motor 30 is configured to supply power and the motor 30 drives the saw blade 103 to cut the workpiece placed on the bench 102.

The power tool 100 has a substantially identical overall structure to a common miter saw structure, which will not be described in detail herein.

Figure 2:
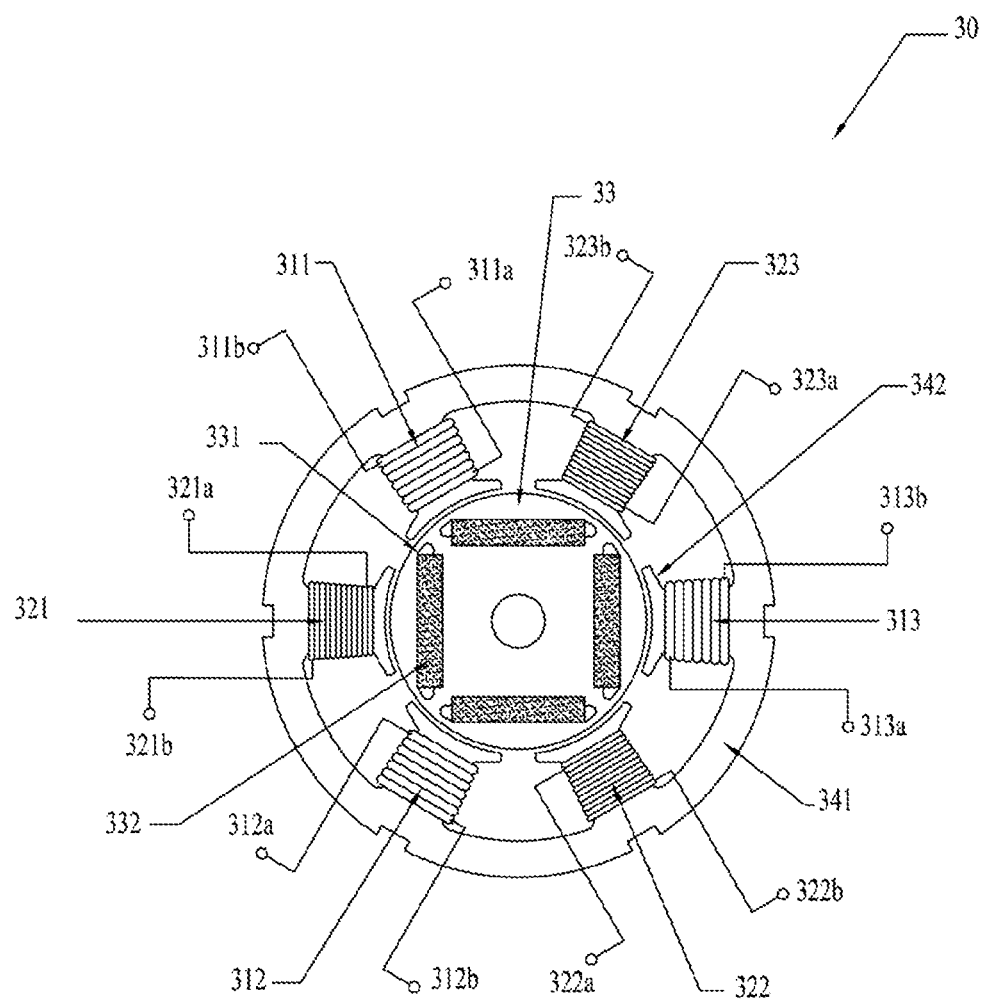
FIG. 2 is a structural diagram of an example motor.
Figure 3:
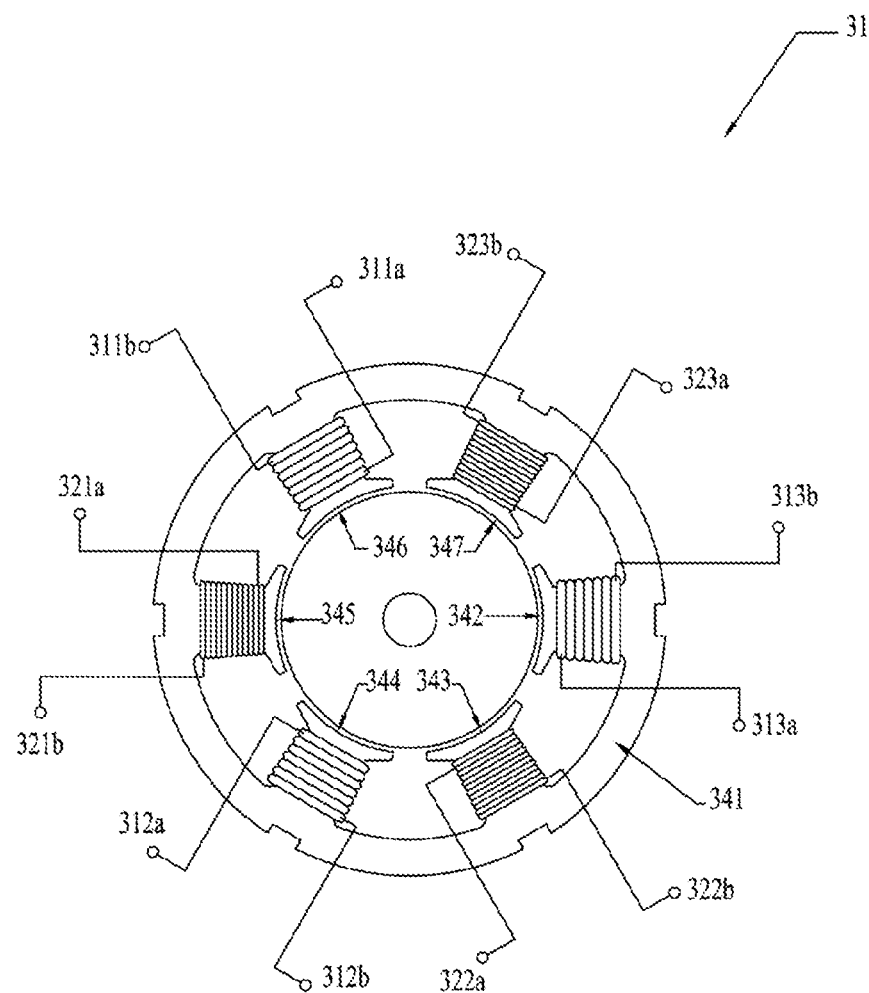
FIG. 3 is a structural diagram of a stator of the motor illustrated in FIG. 2.

FIG. 2 and FIG. 3 are structural diagrams of the motor 30. The motor 30 includes a rotor 33 capable of driving the saw blade 103 and a stator 31 configured to generate a magnetic field for driving the rotor 33. When the motor 30 is powered on, the stator 31 generates the magnetic field to drive the rotor 33 to rotate, thereby driving the saw blade 103 connected to the rotor to cut the workpiece. Specifically, the motor 30 is a brushless DC inner-rotor motor. Of course, the motor 30 may also be an outer-rotor motor.

The rotor 33 is configured to rotate about a central axis. The rotor 33 is provided with permanent magnet slots 331. The permanent magnet slots 331 are spaced in a circumferential direction of the central axis and configured to place the permanent magnets 332 capable of generating or inducing a magnetic field. The rotor 33 is sleeved within the stator 31 and a radial gap exists between the rotor 33 and the stator 31.

The stator 31 includes a ring-shaped yoke portion 341, a plurality of teeth 342 formed by protruding from an inner side of the ring-shaped yoke portion 341 (if the motor is an outer-rotor motor, the stator includes a plurality of teeth formed by protruding from an outer side of the ring-shaped yoke portion 341), a plurality of first-type windings and a plurality of second-type windings. The plurality of first-type windings is wound around part of the plurality of teeth 342, and the plurality of second-type windings is wound around the other part of the plurality of teeth. The first-type windings and the second-type windings are spaced in the circumferential direction of the central axis.

The arrangement in which first-type windings and the second-type windings are spaced in the circumferential direction of the central axis here refers to that as long as at least one first-type winding is disposed between two second-type windings in a circumferential direction of the central axis, it is thought that the first-type windings and the second-type windings are spaced in the circumferential direction of the central axis.

In a specific example, as shown in FIG. 3, the stator includes six teeth 342, 343, 344, 345, 346 and 347 formed by protruding from the inner side of the ring-shaped yoke portion 341. Three first-type windings 311, 312 and 313 are respectively wound around the teeth 342, 344 and 346. Three second-type windings 321, 322 and 323 are respectively wound around the other teeth 343, 345 and 347. The first-type windings 311, 312 and 313 and the second-type windings 321, 322 and 323 are arranged alternatingly in the circumferential direction of the central axis.

Specifically, the first-type windings 311, 312 and 313 are respectively wound around the teeth 342, 344 and 346 by using a plurality of first winding wires of a same diameter. Each first-type winding 311, 312 and 313 has an input end 311$a$, 312$a$ and 313$a$ and an output end 311$b$, 312$b$ and 313$b$. The input ends 311$a$, 312$a$ and 313$a$ are configured to respectively access a first voltage through the first power source access circuit. Each of the output ends 311$b$, 312$b$ and 313$b$ is connected to the input ends or terminals of other first-type windings to form a star or delta connection among the three first-type windings.

The second-type windings 321, 322 and 323 are wound around the teeth 343, 345 and 347 by using a plurality of second winding wires of a different diameter from the first winding wires. Similarly, each second-type winding 321, 322 and 323 has an input end 321$a$, 322$a$ and 323$a$ and an output end 321$b$, 322$b$ and 323$b$. The input ends 321$a$, 322$a$ and 323$a$ are configured to respectively access a second voltage through the second power source access circuit. Each of the output ends 311$b$, 312$b$ and 313$b$ is connected to the input ends or terminals of other second-type windings to form a star or delta connection among the three second-type windings.

Figure 4:
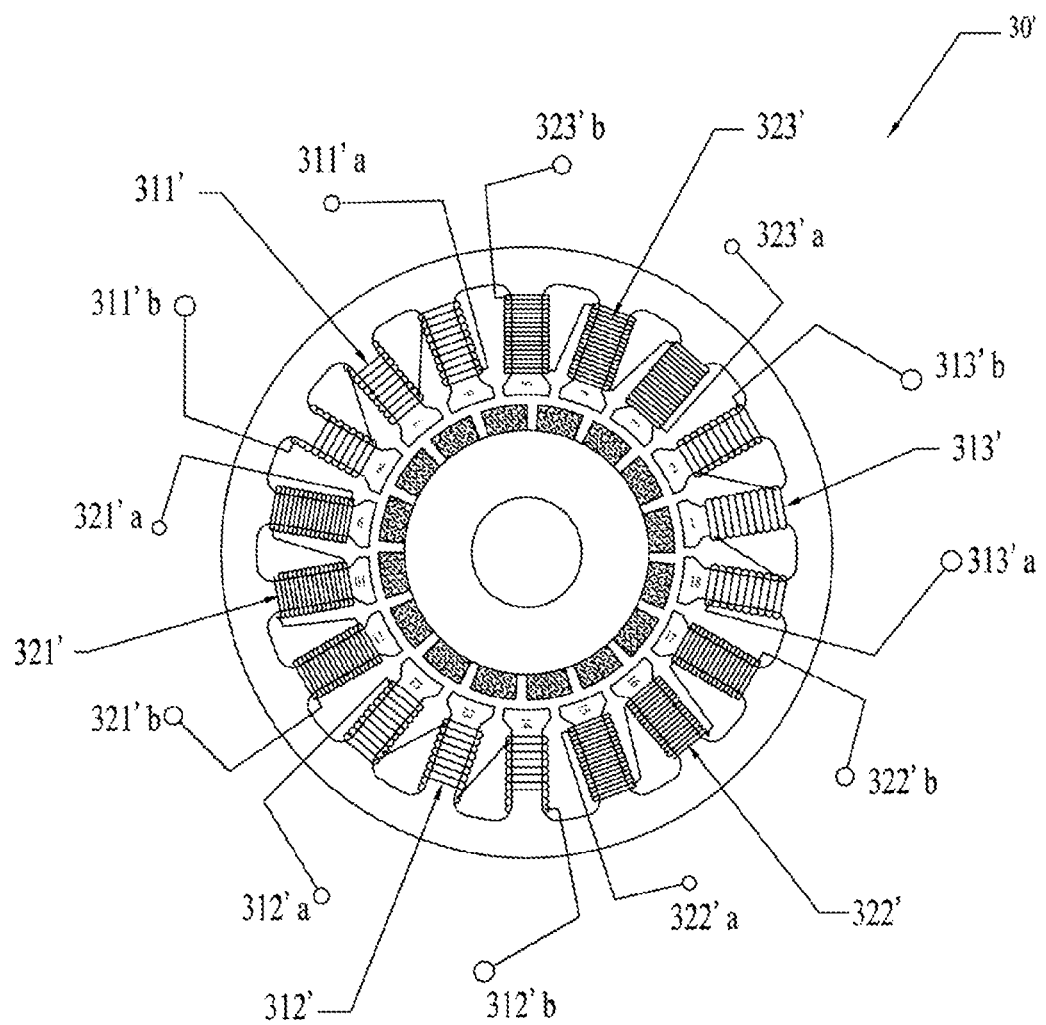
FIG. 4 is a structural diagram of another motor example.

With such a design, the input ends 311$a$, 312$a$ and 313$a$ of the first-type windings and the input ends 321$a$, 322$a$ and 323$a$ of the second-type windings may access different voltages so that the motor 30 may access different voltages. The first-type windings and the second-type windings may have different numbers of turns and may use winding wires of different diameters and different resistivity according to application requirements of the motor 30. In this example, each tooth of the motor 30 is wound by one winding. The motor 30 is a six-slot three-phase motor. In another specific example, FIG. 4 is a structural diagram of another motor 30'. Similarly, the motor 30' includes three first-type windings 311', 312' and 313' wound around part of the plurality of teeth and three second-type windings 321', 322' and 323' wound around the other part of the plurality of teeth.

Each first-type winding 311', 312' and 313' has an input end 311'$a$, 312'$a$ and 313'$a$ and an output end 311'$b$, 312'$b$ and 313'$b$. Each second-type winding 321', 322' and 323' has an input end 321'$a$, 322'$a$ and 323'$a$ and an output end 321'$b$, 322'$b$ and 323'$b$. The input ends 321'$a$, 322'$a$ and 323'$a$ access the first voltage, and the input ends 321'$a$, 322'$a$ and 323'$a$ access the second voltage different from the first voltage so that the motor 30' may access different voltages.

Compared with the motor shown in FIG. 2, one winding of the motor 30' is wound around multiple teeth. Specifically, as shown in FIG. 4, one winding is wound around three adjacent teeth. Of course, one winding may also be wound around two or more teeth.

Apparently, as an extended solution, each first-type winding in the motor may also be wound around two teeth and each second-type winding in the motor may also be wound around three teeth. The first-type windings and the second-type windings may be arranged alternatingly in the circumferential direction of the central axis, and each first-type winding is disposed between two second-type windings.

Figure 5:
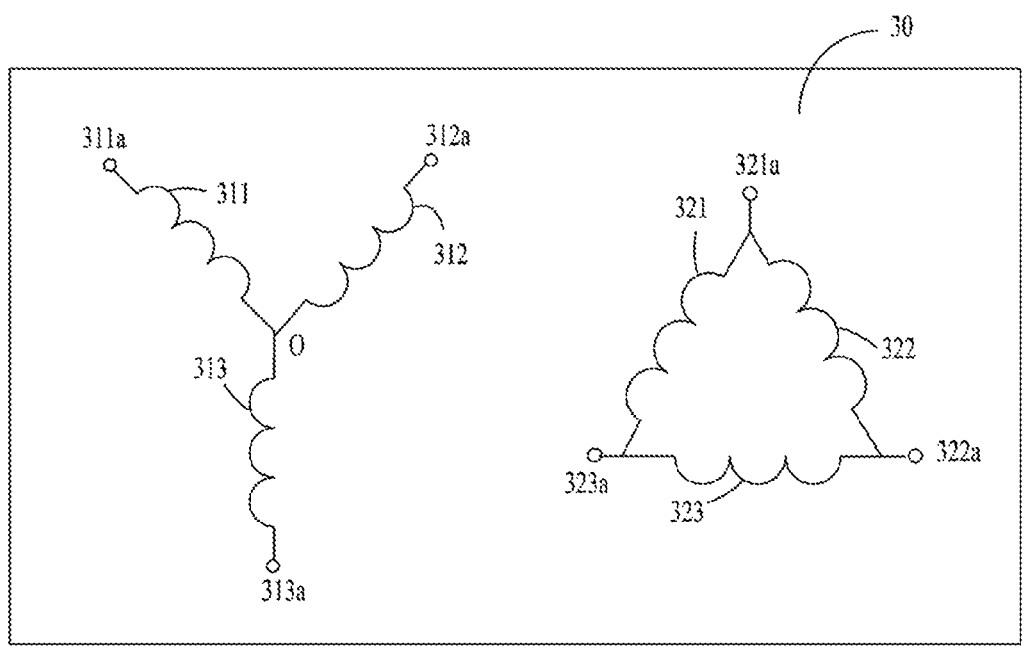
FIG. 5 is a connection diagram of example windings of the motor illustrated in FIG. 2.

Referring to FIG. 5, the first-type windings 311, 312 and 313 are connected in a different manner from the second-type windings 321, 322 and 323 to form two groups of three-phase terminals, each group accessing different voltages. Specifically, the output ends 311$b$, 312$b$ and 313$b$ of the first-type windings 311, 312 and 313 are connected together to a neutral point O to form a star connection, and the output ends 321$b$, 322$b$ and 323$b$ of the second-type windings 321, 322 and 323 are connected together to a neutral point to form a star connection. Alternatively, the terminals of the first-type windings 311, 312 and 313 are connected in an end-to-end manner to form a delta connection, and the terminals of the second-type windings 321, 322 and 323 are connected in an end-to-end manner to form a delta connection. Alternatively, the first-type windings 311, 312 and 313 form a star connection and the second-type windings 321, 322 and 323 form a delta connection (as shown in FIG. 5).

In the above motor in which the first-type windings and the second-type windings are arranged alternatingly in the circumferential direction of the central axis, the sum of the number of first-type windings and the number of second-type windings in the motor is an even multiple of the number of phases of the motor. Specifically, for a three-phase motor, the sum of the number of first-type windings and the number of second-type windings is a multiple of 6.

The first power source access circuit 10 is configured to access a first power source with the first voltage. The second power source access circuit 20 is configured to access a second power source with the second voltage. The first voltage of the first power source is different from the second voltage of the second power source. That is to say, the first power source and the second power source may be two DC power sources with different voltages, or two AC power sources with different voltages, or an AC power source and a DC power source with different voltages.

Specifically, in the power tool 100, the first power source access circuit 10 includes a battery pack interface 105. The battery pack interface 105 is disposed on the support 104 and is configured to access a DC electricity supplied by a battery pack 107. The second power source access circuit 20 includes an AC plug 106 configured to access AC mains. Possibly, the voltage of the DC electricity is smaller than the voltage of the AC mains.

In a specific implementation, the first power source access circuit 10 accesses the DC electricity and the plurality of first-type windings form an angular connection and the second power source access circuit 20 accesses an AC electricity and the plurality of second-type windings form a star connection. Such a connection manner avoids mutual interference introduced by different power sources accessed by the power tool and the winding manner is simple.

A first filter circuit 15 is electrically connected to the first power source access circuit 10 and is configured to filter out clutter in a first power source signal accessed by the first power source access circuit 10. Specifically, the first filter circuit 15 includes a filter capacitor C1.

Figure 6:
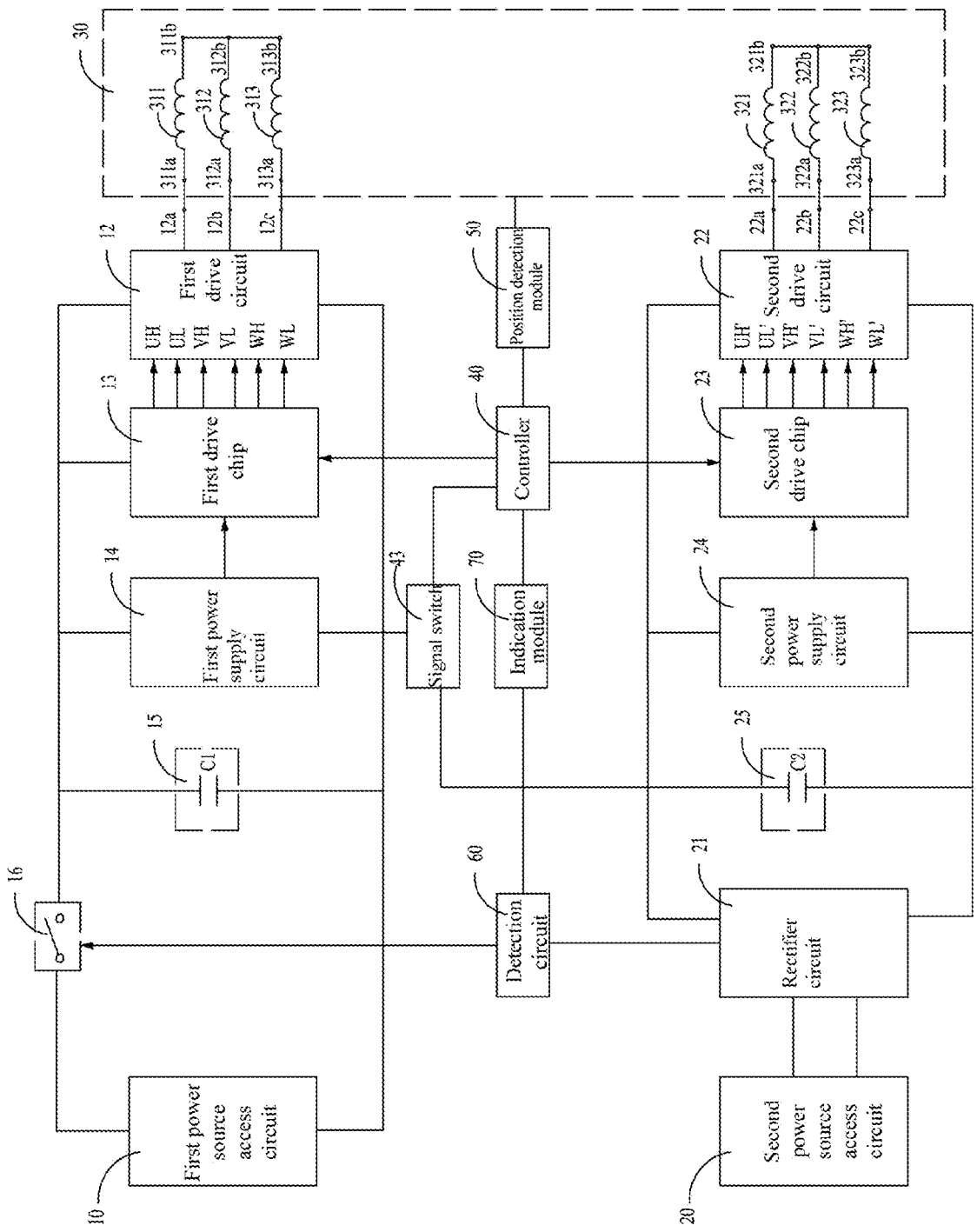
FIG. 6 is an example circuit connection diagram of the power tool illustrated in FIG. 1.

Referring to FIG. 6, when the second power source access circuit 20 accesses the AC mains, a rectifier circuit 21 is connected in series between the second power source access circuit 20 and the motor 30, and is configured to convert an AC electricity into a DC electricity and output the DC current to the motor 30. Specifically, the rectifier circuit 21 includes a rectifier bridge and an electromagnetic interference (EMI) circuit.

A second filter circuit 25 is electrically connected to the second power source access circuit 20. More specifically, the second filter circuit 25 is electrically connected to the rectifier circuit 21 and is configured to filter out clutter in the DC electricity outputted from the rectifier circuit 21 to supply a smooth DC signal to the motor 30. Specifically, the second filter circuit 25 includes a filter capacitor C2.

A first power supply circuit 14 is electrically coupled to the first power source access circuit 10 and is configured to power other circuits or modules in the power tool. Specifically, the voltage of the first power source accessed by the first power supply circuit 14 is converted by the first power supply circuit 14 to power the first drive circuit 12, a first drive chip 13 and the controller 40.

A second power supply circuit 24 is electrically connected to the second power source access circuit 20. The voltage of the second power source accessed by the second power supply circuit 24 is converted by the second power supply circuit 24 to power the second drive circuit 22 and a second drive chip 23.

Apparently, in some specific circuits, the first power supply circuit 14 and the second power supply circuit 24 may also be configured as a whole power supply module to power the first drive circuit 12, the second drive circuit 22, the first drive chip 13, the second drive chip 23 and the controller 40.

Figure 7:
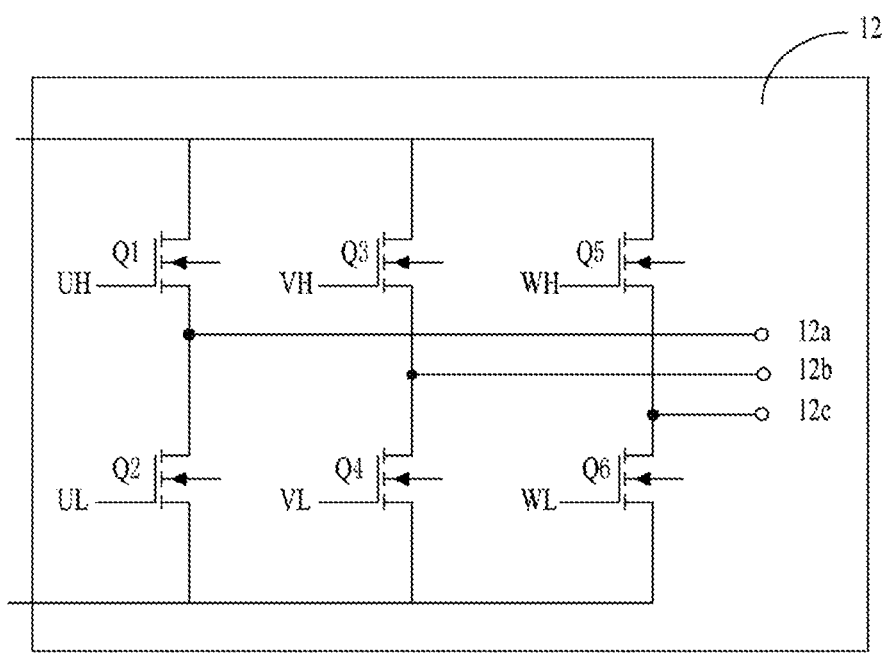
FIG. 7 is an example circuit connection diagram of a first drive circuit.

The first drive circuit 12 includes a plurality of first-type electronic switches which are connected between the first-type windings 311, 312 and 313 and the first power source access circuit 10. Referring to FIG. 7, the first drive circuit 12 includes six first-type electronic switches Q1, Q2, Q3, Q4, Q5 and Q6. The six first-type electronic switches have their respective enable ends UH, UL, VH, VL, WH and WL as input ends of the first drive circuit 12 to receive a control signal from the controller 40. The first drive circuit 12 has three output ends 12a, 12b and 12c. The output end 12a is connected to the input end 311a of the first-type winding 311, the output end 12b is connected to the input end 312a of the first-type winding 312, and the output end 12c is connected to the input end 313a of the first-type winding 313. In this way, the first power source accessed by the first power source access circuit 10 is accessed by the first-type windings 311, 312 and 313 via the output ends 12a, 12b and 12c of the first drive circuit 12 to provide electrical energy for operating the motor 30. Specifically, the first-type electronic switches are semiconductor power transistors.

To enable the first drive circuit 12 to respond to the control signal outputted from the controller 40, the first drive chip 13 is connected in series between the first drive circuit 12 and the controller 40. The first drive chip 13 is configured to convert the control signal outputted from the controller 40 into a voltage signal identifiable to the first drive circuit 12 and output the voltage signal to the first drive circuit 12. Of course, in some specific circuit structures, the first drive chip 13 and the first drive circuit 12 may also be configured as a whole circuit.

Similarly, the second drive chip 23 is connected in series between the controller 40 and the second drive circuit 22. The second drive chip 23 is configured to convert the control signal outputted from the controller 40 into a voltage signal identifiable to the second drive circuit 22 and output the voltage signal to the second drive circuit 22. The second drive chip 23 and the second drive circuit 23 may also be configured as a whole circuit. In another specific circuit structure, the first drive chip 13 and the second drive chip 23 may also be configured as a whole drive chip connected to the controller 40.

The second drive circuit 22 includes a plurality of second-type electronic switches which are connected between the second-type windings 321, 322 and 323 and the second power source access circuit 20. Similarly, the second drive circuit 22 includes six second-type electronic switches. The six second-type electronic switches have their respective enable ends UH', UL', VH', VL', WH' and WL' as input ends of the second drive circuit 22 to receive the control signal from the controller 40. The second drive circuit 22 has three output ends 22a, 12b and 12c. The output end 22a is connected to the input end 321a of the second-type winding 321, the output end 22b is connected to the input end 322a of the second-type winding 322, and the output end 22c is connected to the input end 323a of the second-type winding 323. In this way, the second power source accessed by the second power source access circuit 20 is accessed by the second-type windings 321, 322 and 323 via the output ends 22a, 22b and 22c of the second drive circuit 22 to provide the electrical energy for operating the motor 30. Specifically, the second-type electronic switches are semiconductor power transistors.

The first-type electronic switches and the second-type electronic switches may be electronic switches with different withstand voltages. Specifically, the first power source access circuit 10 accesses the DC electricity, and the second power source access circuit 20 accesses the AC electricity. The first-type electronic switches have a lower withstand voltage value than the second-type electronic switches. The two types of electronic switches avoid the influence of different power sources accessed by the first power source access circuit and the second power source access circuit, and the electronic switches with different withstand voltages are adopted to increase safety of the power tool and meanwhile reduce production costs. The voltage of the DC electricity ranges from 14V to 60V. Furthermore, the voltage of the DC electricity ranges from 18V to 56V, and the voltage of the AC electricity ranges from 110V to 130V or 210V to 230V.

A position detection module 50 is electrically connected to the motor 30 and is configured to detect a position of the rotor of the motor 30. An output end of the position detection module 50 is connected to the controller 40. Specifically, the position detection module 50 includes a Hall sensor disposed on an iron core of the rotor to detect the rotating position of the rotor. Of course, a plurality of position detection modules 50 may also be disposed to detect the position of the rotor.

The controller 40 is configured to generate the control signal for switching on or off the first-type electronic switches or the second-type electronic switches. Specifically, according to the position of the rotor detected by the position detection module 50, the controller 40 outputs a first control signal for switching on or off each power switch transistor in the first drive circuit 12, thereby supplying the first voltage applied by the first power source access circuit 10 on the first drive circuit 12 to the input ends 311*a*, 312*a* and 313*a* of the first-type windings as a three-phase voltage.

When the first power source accessed by the first power source access circuit 10 is a DC power source and the second power source accessed by the second power source access circuit 22 is an AC power source, the controller 40 only generates a second control signal for switching on or off the second-type electronic switches and does not generate the first control signal for switching on or off the first-type electronic switches. That is to say, when the power tool 100 simultaneously accesses the DC power source and the AC power source, only the AC power source is accessed to power the motor. A detection circuit 60 is configured to detect whether the first power source access circuit 10 is in access to the first power source or whether the second power source access circuit 20 is in access to the second power source. A switch 16 is connected in series between the first power source access circuit 10 and the first drive circuit 12 and is configured to switch on or off an electrical connection between the first power source access circuit 10 and the first drive circuit 12. Specifically, when the detection circuit 60 detects that the second power source access circuit 20 is in access to the second power source, the detection circuit 60 outputs a control signal for switching off the electrical connection between the first power source access circuit 10 and the first drive circuit 12 to the switch 16. At this time, the second power source accessed by the second power source access circuit 20 powers the motor. The opposite also holds true.

More specifically, the first power source access circuit 10 accesses the DC electricity supplied by the battery pack, and the second power source access circuit 20 includes an AC plug configured to access the AC electricity. In this way, when the power tool 100 accesses the DC electricity and the AC electricity at the same time, the power tool 100 is only powered by the second power supply circuit 24 that may access the AC electricity, thereby saving power energy. In a failure of the AC electricity accessed by the AC plug, the controller controller 40 first generates a control signal for switching off all the second-type electronic switches, and then generates a control signal for switching on the first-type electronic switches to enable the first power source access circuit 10 to access the first power source (for example, the DC outputted from the battery pack) to power the motor 30.

A signal switch 43 is electrically connected to the first power source access circuit 10, the second power source access circuit 20 and the controller 40. The signal switch 43 is configured to transmit a control signal for starting or activating the controller 40.

An indication module 70 is configured to indicate whether the first power source access circuit 10 is in access to the first power source and/or whether the second power source access circuit 20 is in access to the second power source. The indication module 70 is connected to the detection circuit. Specifically, the indication module 70 includes a first indication unit 71 and a second indication unit 72. The first indication unit 71 has two states: indicating that the first power source access circuit 10 is in access to the first power source and indicating that the first power source access circuit 10 is not in access to the first power source. The second indication unit 72 has two states: indicating that the second power source access circuit 20 is in access to the second power source and indicating that the second power source access circuit 20 is not in access to the second power source. More specifically, each of the first indication unit 71 and the second indication unit 72 includes an indicator light. The indicator light is in an on state when a power source is accessed and the indicator light is in an off state when the power source is not accessed. When the detection circuit 60 detects that the first power source access circuit 10 is in access to the first power source, the indicator light of the first indication unit 71 is in the on state, and when the detection circuit 60 detects that the second power source access circuit 20 is in access to the second power source, the indicator light of the second indication unit 72 is in the on state.

A working process of the power tool 100 will be described in detail below.

The signal switch 43, when triggered by a user, transmits the control signal to the controller 40. The controller 40 is activated.

The detection circuit 60 detects whether the first power source access circuit 10 is in access to the DC electricity and/or whether the second power source access circuit 20 is in access to the AC electricity.

If the detection circuit 60 detects that the first power source access circuit 10 is in access to the DC electricity and the second power source access circuit 20 is in access to the AC electricity, the controller 40 outputs the control signal for switching on the second-type electronic switches to enable the second drive circuit 22 to drive the motor 30 to operate. At this time, the AC power source accessed by the second power source access circuit 20 provides electrical energy for the motor.

If the detection circuit 60 detects that the first power source access circuit 10 is in access to the DC electricity and the second power source access circuit 20 is not in access to the AC electricity, the controller 40 outputs the control signal for switching on the first-type electronic switches to enable the first drive circuit 12 to drive the motor 30 to operate. At this time, the DC power source accessed by the first power source access circuit 10 provides electrical energy for the motor.

If the detection circuit 60 detects that the first power source access circuit 10 is not in access to the DC electricity and the second power source access circuit 20 is in access to the AC electricity, the controller 40 outputs the control signal for switching on the second-type electronic switches to enable the second drive circuit 22 to drive the motor 30 to operate. At this time, the AC power source accessed by the second power source access circuit 20 provides electrical energy for the motor.

In practical applications, as a possible implementation, if the first power source access circuit 10 first accesses the DC electricity and then the second power source access circuit 20 accesses the AC electricity, the controller 40 outputs the control signal for switching on the second-type electronic switches when the detection circuit 60 detects that the second power source access circuit 20 accesses the AC electricity, so as to enable the second drive circuit 22 to drive the motor 30 to operate. That is to say, as long as the AC electricity and the DC electricity are accessed at the same time, the controller 40 outputs the control signal for switching on the second-type electronic switches to enable the second drive circuit 22 to drive the motor 30 to operate, thereby saving power energy.

In another possible implementation, in the case where the first power source access circuit 10 is in access to the DC electricity and the second power source access circuit 20 is in access to the AC electricity, in a failure of the AC electricity accessed by the second power source access circuit 20, the controller 40 first outputs the control signals for switching off all the first-type electronic switches and all the second-type electronic switches, and then outputs the control signal for switching on the first-type electronic switches to enable the first drive circuit 12 to drive the motor to operate, thereby ensuring power safety.

Of course, the controller 40 may also be configured as a first controller electrically connected to the first drive circuit 12 and a second controller electrically connected to the second drive circuit 22. A first signal switch is electrically connected to the first controller and a second signal switch is electrically connected to the second controller.

The power tool 100 as described above is compatible with two power sources with different voltages to provide electrical energy required for its operation, and the motor 30 has substantially the same output characteristic parameters when the first power source access circuit accesses the first power source and when the second power source access circuit accesses the second power source, so that the user feels substantially the same power of the power tool when switching between the two power sources with different voltages, thereby avoiding affecting user experience by different output characteristic parameters of the motor during the switching between the two power sources with different voltages.

The substantially same output characteristic parameters of the motor 30 refers to the substantially same rotational speed, torque or output power. Specifically, the ratio of the rotational speed of the motor when the second power source access circuit of the power tool accesses the second power source to the rotational speed of the motor when the first power source access circuit accesses the first power source ranges from 0.8 to 1.2. More specifically, the ratio of the rotational speed of the motor when the second power source access circuit of the power tool accesses the second power source to the rotational speed of the motor when the first power source access circuit accesses the first power source ranges from 0.8 to 0.9 or from 1.1 to 1.2.

The ratio of the output power of the motor when the second power source access circuit of the power tool accesses the second power source to the output power of the motor when the first power source access circuit accesses the first power source ranges from 0.8 to 1.2. More specifically, the ratio of the output power of the motor when the second power source access circuit of the power tool accesses the second power source to the output power of the motor when the first power source access circuit accesses the first power source ranges from 0.8 to 0.9 or from 1.1 to 1.2.

The ratio of the torque of the motor when the second power source access circuit of the power tool accesses the second power source to the torque of the motor when the first power source access circuit accesses the first power source ranges from 0.8 to 1.2. More specifically, the ratio of the torque of the motor when the second power source access circuit of the power tool accesses the second power source to the torque of the motor when the first power source access circuit accesses the first power source ranges from 0.8 to 0.9 or from 1.1 to 1.2.

Figure 8:
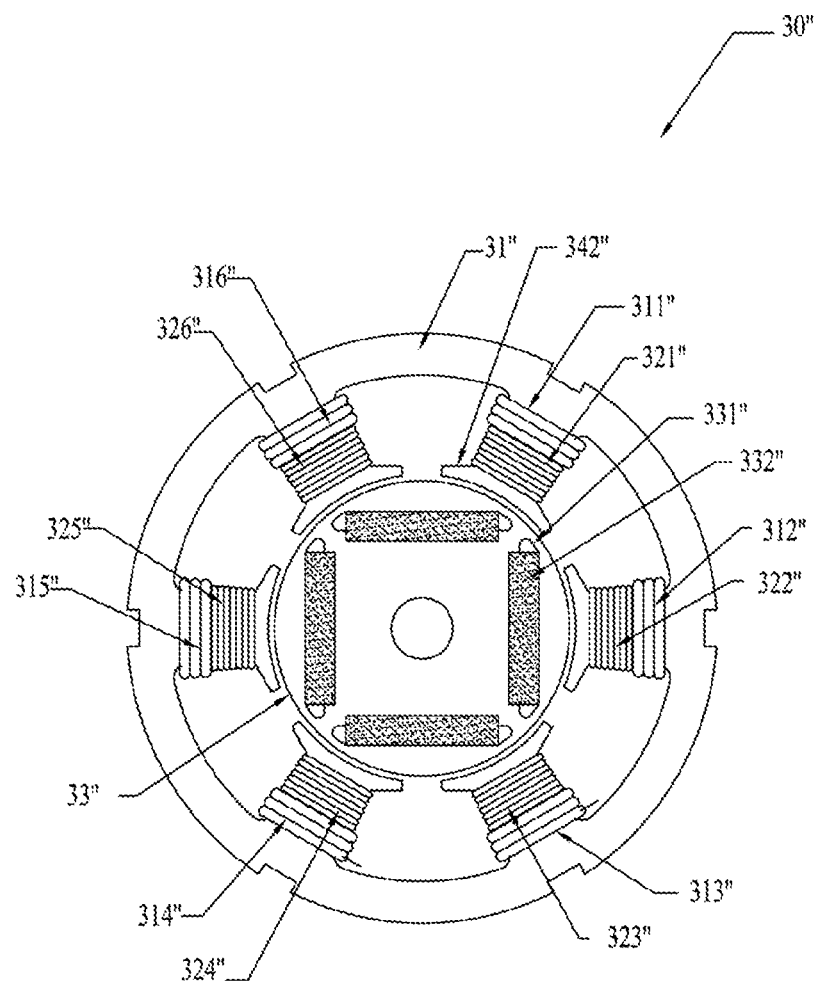
FIG. 8 is a structural diagram of another motor example.

Referring to the structural diagram of another motor shown in FIG. 8, the motor 30" includes a rotor 33" configured to rotate about a central axis and a stator 31" configured to generate a magnetic field for driving the rotor 33".

The rotor 33" is provided with permanent magnet slots 331". The permanent magnet slots 331" are spaced in a circumferential direction of the central axis and are configured to place the permanent magnets 332" capable of generating or inducing the magnetic field. The rotor 33" is sleeved within the stator 31", and a radial gap exists between the rotor 33" and the stator 31".

The stator 31" includes a ring-shaped yoke portion 341", a plurality of teeth 342" formed by protruding from an inner side or an outer side of the ring-shaped yoke portion 341", a plurality of first-type windings and a plurality of second-type windings. The first-type windings are configured to generate a first magnetic field under the action of the first power source and the second-type windings are configured to generate a second magnetic field that overlaps the first magnetic field under the action of the second power source. The first-type windings and the second-type windings are arranged in a radial direction of the central axis.

The first-type windings 311", 312", 313", 314", 315" and 316" and the second-type windings 321", 322", 323", 324", 325" and 326" of the motor 30" are arranged in the radial direction of the central axis. Specifically, the first-type winding 311" and the second-type winding 321" are used as an example: the first-type winding 311" and the second-type winding 321" are arranged in order on the same tooth in the radial direction of the central axis. An insulating layer is disposed between the first-type winding 311" and the second-type winding 321" to isolate mutual interference of the two magnetic fields.

It should be noted that the same tooth here includes the same plurality of teeth and the same single tooth.

In this way, the plurality of first-type windings are connected in series or in parallel to form three voltage input ends to access the first power source; the plurality of second-type windings are connected in series or in parallel to form another three voltage input ends to access the second power source.

Figure 9:
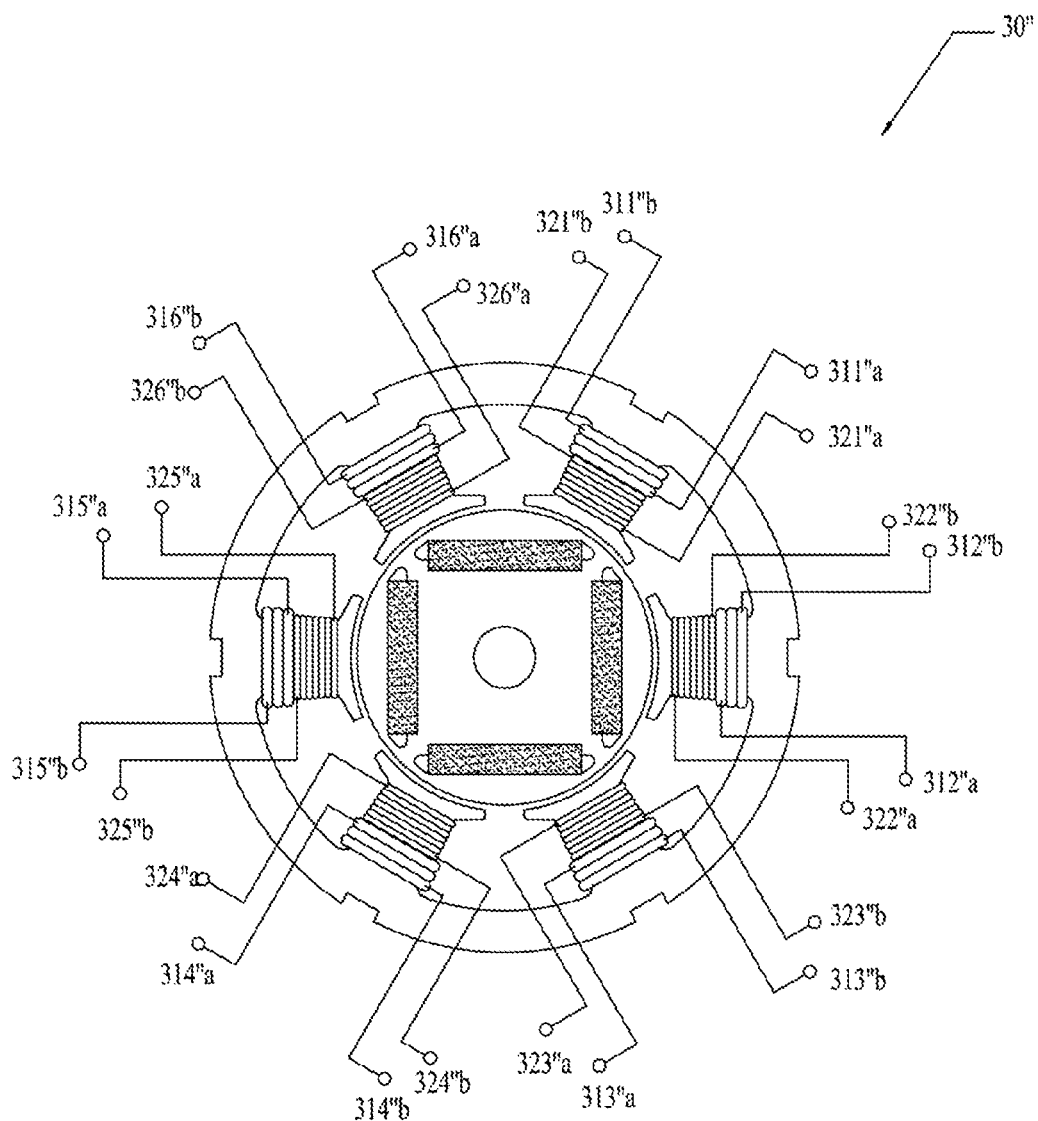
FIG. 9 is a schematic diagram illustrating an example of terminals of windings of the motor illustrated in FIG. 8.
Figure 10:
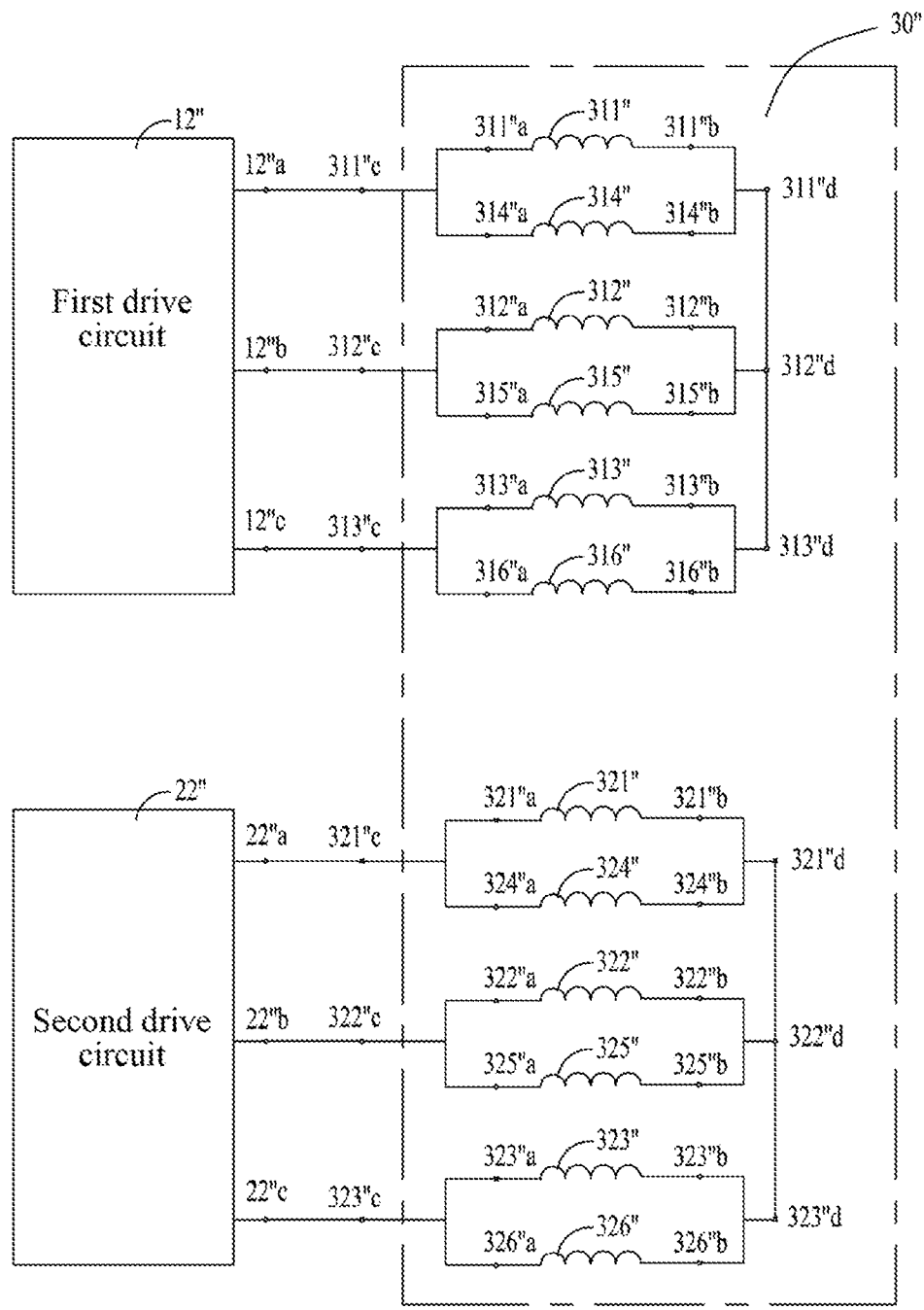
FIG. 10 is an example connection diagram between a drive circuit and terminals of windings of a motor.

The connection of the windings in the motor 30" will be described below with reference to FIG. 8 to FIG. 10.

Each first-type winding have an input end 311"$a$, 312"$a$, 313"$a$, 314"$a$, 315"$a$ and 316"$a$ and an output end 311"$b$, 312"$b$, 313"$b$, 314"$b$, 315"$b$ and 316"$b$. The first-type winding 311" and the first-type winding 314", which are symmetrically disposed with respect to the central axis, are connected in parallel or in series to form a branch with a first input end 311"$c$ and a second input end 311"$d$. Similarly, the first-type winding 312" and the first-type winding 315" are connected in parallel or in series to form a branch with a first input end 312"$c$ and a second input end 312"$d$; and the first-type winding 313" and the first-type winding 316" are connected in parallel or in series to form a branch with a first input end 313"$c$ and a second input end 313"$d$. The first input ends 311"$c$, 312"$c$ and 313"$c$ are respectively connected to the second input ends 311"$d$, 312"$d$ and 313"$d$ in an end-to-end manner so that the first-type windings form an angular connection. The second input ends 311"$d$, 312"$d$ and 313"$d$ are connected to a same neutral point so that the first-type windings form a star connection. The first input ends 311"$c$, 312"$c$ and 313"$c$ are used as three terminals of the first-type windings and respectively connected to output ends 12"$a$, 12"$b$ and 12"$c$ of a first drive circuit 12" to access the first power source.

Each second-type winding have an input end 321"$a$, 322"$a$, 323"$a$, 324"$a$, 325"$a$ and 326"$a$ and an output end 321"*b*, 322"*b*, 323"*b*, 324"*b*, 325"*b* and 326"*b*. The second-type winding 321" and the second-type winding 324" which are symmetrically disposed with respect to the central axis are connected in parallel or in series to form a branch with a second input end 321"*c* and a second input end 321"*d*. Similarly, the second-type winding 322" and the second-type winding 325" are connected in parallel or in series to form a branch with a second input end 322"*c* and a second input end 322"*d*; and the second-type winding 323" and the second-type winding 326" are connected in parallel or in series to form a branch with a second input end 323"*c* and a second input end 323"*d*. The second input ends 321"*c*, 322"*c* and 323"*c* are respectively connected to the second input ends 321"*d*, 322"*d* and 323"*d* in an end-to-end manner so that the second-type windings form an angular connection. The second input ends 321"*d*, 322"*d* and 323"*d* are connected to a same neutral point so that the first-type windings form a star connection. The input ends 321"*c*, 322"*c* and 323"*c* are used as three terminals of the second-type windings and respectively connected to output ends 22"*a*, 22"*b* and 22"*c* of a second drive circuit 22" to access the second power source.

Figure 11:
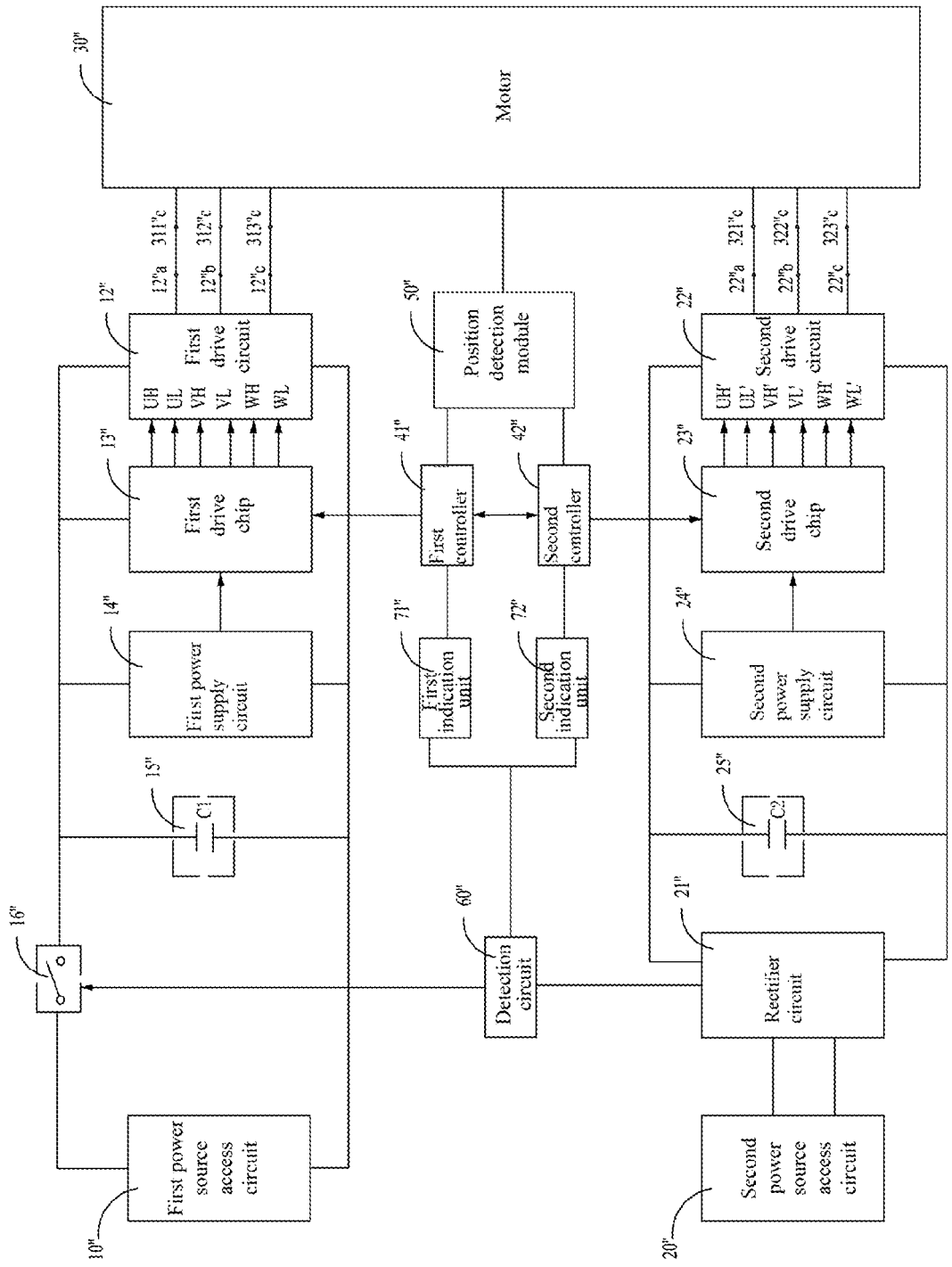
FIG. 11 is another example circuit connection diagram of a power tool.

Referring to another circuit connection diagram of the power tool 100 shown in FIG. 11, the power tool 100 includes a first power source access circuit 10", a second power source access circuit 20", a motor 30", a first drive circuit 12", a second drive circuit 13", a first power supply circuit 14", a first filter circuit 15", a second filter circuit 25", a second power supply circuit 24", a first drive chip 13", a second drive chip 23", a first controller 41", a second controller 42", a signal switch 43", a position detection module 50", a detection circuit 60", a switch 16" and an indication module 70".

Compared with the examples described above, the power tool 100 is provided with the first controller 41" for controlling the first drive circuit 12" and the second controller 42" for controlling the second drive circuit 22". The first controller 41" is communicatively connected to the second controller 42". When the second controller 42" outputs a control signal for switching on or off second-type electronic switches, the first controller 41" does not output a control signal for switching on or off first-type electronic switches.

The signal switch 43" may be further provided to activate or deactivate one of the first controller 41" and the second controller 42". The input ends of the signal switch 43" are respectively connected to the first power source access circuit 10" and the second power source access circuit 20". When the first power source access circuit 10" accesses the first power source, the signal switch 43" activates the first controller 41", that is, switching on an electrical connection between the first power supply circuit 14" and the first controller 41" and switching off an electrical connection between the second power supply circuit 24" and the second controller 42". When the second power source access circuit 20" accesses the second power source, the signal switch 43" activates the second controller 42" and deactivates the first controller 41", that is, switching on the electrical connection between the second power supply circuit 24" and the second controller 42" and switching off the electrical connection between the first power supply circuit 14" and the first controller 41".

Of course, the foregoing solutions may be applied to power tools capable of accessing the AC electricity and the DC electricity such as electric circular saws, sweep-saws, reciprocating saws, angle grinders, cutters and hay mowers.

The above illustrates and describes basic principles, main features and advantages of the present disclosure. It is to be understood by those skilled in the art that the above examples do not limit the present disclosure in any form, and all solutions obtained by means of equivalent substitution or equivalent transformation fall within the protection scope of the present disclosure.

What is claimed is:

1. A power tool, comprising:
    a motor, comprising:
        a rotor rotatable about a central axis; and
        a stator comprising a ring-shaped yoke portion and a plurality of teeth formed by protruding from an inner side or an outer side of the ring-shaped yoke portion;
    a plurality of first windings wound around part of the plurality of teeth;
    a plurality of second windings wound around another part of the plurality of teeth;
    a first power source access circuit operably couplable to access a first power source with a first voltage;
    a first drive circuit, comprising:
        a plurality of first electronic switches connected between the plurality of first windings and the first power source access circuit;
    a second power source access circuit operably coupled to access a second power source with a second voltage; and
    a second drive circuit, comprising:
        a plurality of second electronic switches connected between the plurality of second windings and the second power source access circuit,
    wherein the plurality of first windings and the plurality of second windings are spaced in a circumferential direction of the central axis, and
    wherein the first power source accessed by the first power source access circuit is a direct current power source, the second power source accessed by the second power source access circuit is an alternating current power source, the plurality of first windings form an angular connection, and the plurality of second windings form a star connection.

2. The power tool of claim 1, further comprising a controller generating a control signal for switching on or off at least one of the plurality of first electronic switches or the plurality of second electronic switches, wherein the controller is electrically connected to the first drive circuit and the second drive circuit.

3. The power tool of claim 1, further comprising a detection circuit operable to detect whether the first power source access circuit is in access to the first power source and a switch switching an electrical connection between the first power source access circuit and the first drive circuit wherein, when the second power source access circuit accesses the second power source, the detection circuit switches off the electrical connection between the first power source access circuit and the first drive circuit.

4. The power tool of claim 1, further comprising an indication module indicating at least one of whether the first power source access circuit is in access to the first power source or whether the second power source access circuit is in access to the second power source wherein the indication module is electrically connected to the first power source access circuit and the second power source access circuit.

5. The power tool of claim 1, further comprising an indication module comprising a first indication unit indicating whether the first power source access circuit is in access to the first power source and a second indication unit indicating whether the second power source access circuit is in access to the second power source wherein the first indication unit is electrically connected to the first power source access circuit and the second indication unit is electrically connected to the second power source access circuit.

6. The power tool of claim 2, further comprising a signal switch transmitting a switch signal for starting or activating the controller.

7. The power tool of claim 1, wherein a sum of a number of the plurality of first windings and a number of the plurality of second windings is an even multiple of a number of phases of the motor.

8. The power tool of claim 1, wherein the motor is a three-phase motor, and a sum of a number of the plurality of first windings and a number of the plurality of second windings is a multiple of 6.

9. The power tool of claim 1, wherein the motor outputs a same output characteristic parameter when the first power source access circuit accesses the first power source and when the second power source access circuit accesses the second power source and the output characteristic parameter of the motor comprises at least one of a rotational speed, torque, or output power of the motor.

10. The power tool of claim 1, wherein the plurality of first windings and the plurality of second windings have at least one of different winding wire diameters or numbers of winding turns.

11. The power tool of claim 1, wherein the plurality of first electronic switches have a lower withstand voltage value than the plurality of second electronic switches.

12. A power tool, comprising:
a first power source access circuit operably couplable to access a first power source with a first voltage;
a second power source access circuit operably couplable to access a second power source with a second voltage;
a motor, comprising:
a rotor rotatable about a central axis; and
a stator comprising a ring-shaped yoke portion and a plurality of teeth formed by protruding from an inner side or outer side of the ring-shaped yoke portion;
a plurality of first windings generating a first magnetic field under an action of the first power source;
a plurality of second windings generating a second magnetic field overlapping the first magnetic field under an action of the second power source;
a first drive circuit, comprising:
a plurality of first electronic switches connected between the plurality of first windings and the first power source access circuit; and
a second drive circuit, comprising:
a plurality of second electronic switches connected between the plurality of second windings and the second power source access circuit;
wherein the plurality of first windings and the plurality of second windings are arranged in a radial direction of the central axis, and
wherein the first power source accessed by the first power source access circuit is a direct current power source, the second power source accessed by the second power source access circuit is an alternating current power source, the plurality of first windings form an angular connection, and the plurality of second windings form a star connection.

13. The power tool of claim 12, further comprising an insulating layer disposed between the plurality of the first windings and the plurality the second windings.

14. The power tool of claim 12, further comprising a first controller generating a control signal for switching on or off the plurality of first electronic switches and a second controller generating a control signal for switching on or off the plurality of second electronic switches wherein the first controller is communicatively connected to the second controller.

15. The power tool of claim 12, further comprising a detection circuit detecting whether the first power source access circuit is in access to the first power source and a switch switching on or off an electrical connection between the first power source access circuit and the first drive circuit wherein, when the second power source access circuit accesses the second power source, the detection circuit controls the switch to switch off the electrical connection between the first power source access circuit and the first drive circuit.

16. The power tool of claim 12, further comprising an indication module comprising a first indication unit indicating whether the first power source access circuit is in access to the first power source and a second indication unit indicating whether the second power source access circuit is in access to the second power source wherein the first indication unit is electrically connected to the first power source access circuit and the second indication unit is electrically connected to the second power source access circuit.

17. The power tool of claim 14, further comprising a signal switch transmitting a switch signal for starting or activating the first controller or the second controller.

18. The power tool of claim 12, wherein the motor is a three-phase motor.

19. The power tool of claim 12, wherein the first power source accessed by the first power source access circuit is an alternating current power source and the second power source accessed by the second power source access circuit is a direct current power source, and
the motor is configured such that a ratio of an output characteristic parameter of the motor when the first power source access circuit is in access to the first power source to the output characteristic parameter of the motor when the second power source access circuit is in access to the second power source is within a value range of 0.8 to 1.2 and the output characteristic parameter of the motor comprises a rotational speed, torque or output power of the motor.

20. The power tool of claim 12, wherein the plurality of first typo first windings and the plurality of second windings have at least one of different winding wire diameters or numbers of winding turns.

21. The power tool of claim 12, wherein the plurality of first typo first electronic switches have a lower withstand voltage value than the plurality of second electronic switches.

* * * * *